US009095907B2

United States Patent
Mullet et al.

(10) Patent No.: US 9,095,907 B2
(45) Date of Patent: Aug. 4, 2015

(54) DRAPERY TUBE INCORPORATING BATTERIES WITHIN THE DRAPERY TUBE, WITH A STOP FOR FACILITATING THE LOADING AND UNLOADING OF THE BATTERIES

(71) Applicant: QMOTION INCORPORATED, Pensacola, FL (US)

(72) Inventors: Willis Jay Mullet, Gulf Breeze, FL (US); Michael D. Fox, Pensacola, FL (US)

(73) Assignee: QMOTION INCORPORATED, Pensacola, FL (US)

( * ) Notice: Subject to any disclaimer, the term of this patent is extended or adjusted under 35 U.S.C. 154(b) by 123 days.

(21) Appl. No.: 13/842,586

(22) Filed: Mar. 15, 2013

(65) Prior Publication Data

US 2014/0076508 A1    Mar. 20, 2014

Related U.S. Application Data

(60) Provisional application No. 61/702,093, filed on Sep. 17, 2012.

(51) Int. Cl.
*A47H 1/00* (2006.01)
*B23B 1/00* (2006.01)
(Continued)

(52) U.S. Cl.
CPC .. *B23B 1/00* (2013.01); *A47H 1/02* (2013.01); *A47H 5/06* (2013.01); *A47H 23/00* (2013.01); *B23B 3/00* (2013.01); *B23B 5/08* (2013.01); *B23B 29/26* (2013.01); *B23Q 1/766* (2013.01); *E06B 9/40* (2013.01); *E06B 9/72* (2013.01); *B23B 2215/72* (2013.01);
(Continued)

(58) Field of Classification Search
CPC ............................ B23B 1/00; B23B 2260/024
USPC ........... 160/340, 343, 311, 331, 133, 168.1 P, 160/176.1 P, 310
See application file for complete search history.

(56) References Cited

U.S. PATENT DOCUMENTS 3,999,110 A * 12/1976 Ramstrom et al. ............ 320/112
4,131,831 A   12/1978 Bochenek et al.
(Continued)

FOREIGN PATENT DOCUMENTS

JP   2006-304984    11/2006
JP   2006-314389    11/2006
(Continued)

*Primary Examiner* — Katherine Mitchell
*Assistant Examiner* — Johnnie A Shablack
(74) *Attorney, Agent, or Firm* — Zarley Law Firm, P.L.C.

(57) ABSTRACT

A motorized window covering is presented having an elongated hollow rod. A battery tube is positioned within the hollow rod. The battery tube has a hollow interior with an elongated spring therein and a stop positioned adjacent an open end of the battery tube. An end cap closes the open end of the battery tube. A plurality of batteries are inserted in end-to-end alignment into the hollow interior of the battery tube. As each battery is inserted, the stop deflects thereby allowing the battery past the stop. Once each battery passes the stop, the stop moves into a stop position thereby holding the battery within the battery tube. To remove each of the plurality of batteries, the stop is deflected and the spring forces the battery out of the hollow interior of the battery tube. The battery tube is electrically connected to a motor that when activated rotates the rod thereby operating the window covering.

20 Claims, 11 Drawing Sheets

(51) Int. Cl.
  *A47H 1/02* (2006.01)
  *E06B 9/72* (2006.01)
  *A47H 5/06* (2006.01)
  *A47H 23/00* (2006.01)
  *E06B 9/40* (2006.01)
  *B23B 29/26* (2006.01)
  *B23B 3/00* (2006.01)
  *B23B 5/08* (2006.01)
  *B23Q 1/76* (2006.01)

(52) U.S. Cl.
  CPC ...... *B23B 2220/12* (2013.01); *B23B 2220/445* (2013.01); *B23B 2260/024* (2013.01); *Y10T 82/10* (2015.01)

(56) References Cited

U.S. PATENT DOCUMENTS

| | | | |
|---|---|---|---|
| 4,171,845 A | 10/1979 | Hirsch | |
| 4,532,194 A * | 7/1985 | Liautaud et al. | 429/99 |
| 4,644,244 A * | 2/1987 | Kittelson | 320/100 |
| 4,724,885 A | 2/1988 | Chang | |
| 4,766,941 A | 8/1988 | Sloop et al. | |
| 4,832,104 A | 5/1989 | De Labarthe et al. | |
| 4,979,582 A | 12/1990 | Forester | |
| 5,547,008 A | 8/1996 | Sullivan | |
| 5,714,855 A | 2/1998 | Domel et al. | |
| 5,729,103 A | 3/1998 | Domel et al. | |
| 5,760,558 A | 6/1998 | Popat | |
| 5,793,174 A | 8/1998 | Kovach et al. | |
| 5,883,480 A | 3/1999 | Domel et al. | |
| 5,907,227 A | 5/1999 | Domel et al. | |
| 5,990,646 A | 11/1999 | Kovach et al. | |
| 6,060,852 A | 5/2000 | Domel et al. | |
| 6,181,089 B1 | 1/2001 | Kovach et al. | |
| 6,189,592 B1 * | 2/2001 | Domel | 160/85 |
| 6,259,218 B1 | 7/2001 | Kovach et al. | |
| 6,369,530 B2 | 4/2002 | Kovach et al. | |
| 6,433,498 B1 | 8/2002 | Domel et al. | |
| 6,533,017 B1 | 3/2003 | Toti | |
| 6,708,750 B2 | 3/2004 | Collett et al. | |
| 6,736,186 B2 * | 5/2004 | Anderson et al. | 160/168.1 P |
| 6,850,017 B1 | 2/2005 | Domel et al. | |
| 7,104,305 B1 | 9/2006 | Apollon | |
| 7,389,806 B2 | 6/2008 | Kates | |
| 7,673,667 B2 * | 3/2010 | Domel et al. | 160/168.1 P |
| 8,299,734 B2 * | 10/2012 | Mullet et al. | 318/255 |
| 8,371,358 B1 * | 2/2013 | Mullet et al. | 160/310 |
| 8,540,005 B2 * | 9/2013 | Baugh et al. | 160/84.02 |
| 8,575,872 B2 * | 11/2013 | Mullet et al. | 318/255 |
| 8,659,246 B2 * | 2/2014 | Mullet et al. | 318/255 |
| 8,723,455 B2 * | 5/2014 | Mullet et al. | 318/34 |
| 2007/0284053 A1 * | 12/2007 | Mullet et al. | 160/31 |
| 2011/0146922 A1 | 6/2011 | Colson et al. | |
| 2012/0181979 A1 * | 7/2012 | Hudspeth et al. | 320/108 |
| 2013/0153162 A1 * | 6/2013 | Blair et al. | 160/310 |
| 2013/0333848 A1 * | 12/2013 | Mullet et al. | 160/310 |
| 2014/0014281 A1 * | 1/2014 | Mullet et al. | 160/311 |

FOREIGN PATENT DOCUMENTS

| | | |
|---|---|---|
| JP | 2009-034301 | 2/2009 |
| JP | 2011-062497 | 3/2011 |
| KR | 100903201 | 6/2009 |
| KR | 2010-0006476 | 1/2010 |
| KR | 20100006476 A | 1/2010 |
| WO | 8602970 A1 | 5/1986 |

* cited by examiner

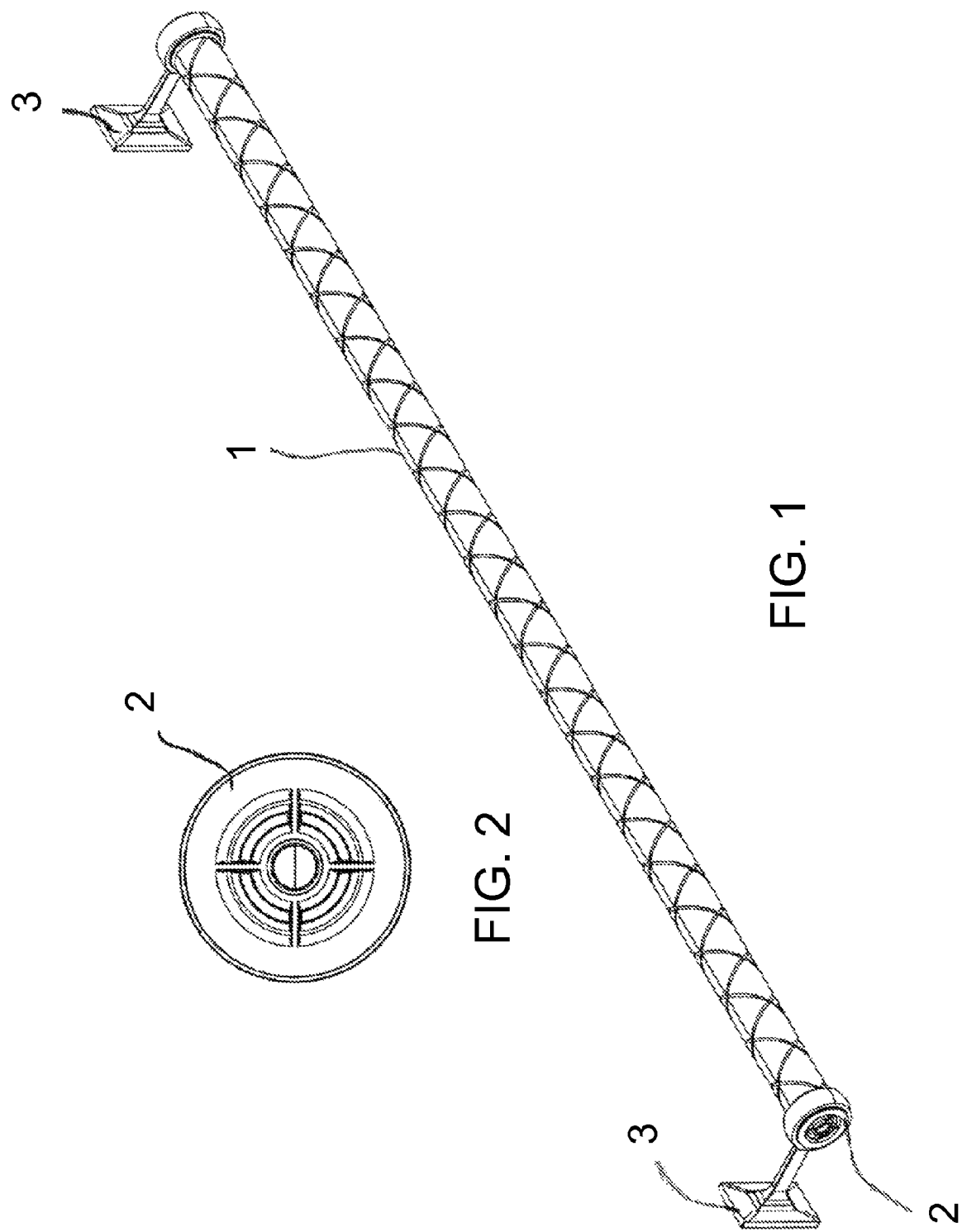

DRAPERY TUBE INCORPORATING BATTERIES WITHIN THE DRAPERY TUBE, WITH A STOP FOR FACILITATING THE LOADING AND UNLOADING OF THE BATTERIES

BACKGROUND OF INVENTION

Embodiments of the invention relate to a drapery tube that can be used to move curtains or draperies along the tube, incorporating batteries within the drapery tube and a stop for facilitating the load and unloading of the batteries.

There are many types of systems for moving, such as horizontal movement, vertical blind, curtains, and draperies. Some use a series of pulleys, cables, and belts. Others use motors mounted on one end with tracks. In such cases, the number of components adds complexity to the assembly and cost.

U.S. Pat. No. 4,131,831 (Bochenek et al.) teaches a drapery opening and closing system for draw draperies which are movable over a traverse member between an open and closed position by use of a drapery drive system. The opening and closing system has limit switches positioned to be activated when the draperies are opened and closed. A manually settable timer connected to a power source applies power at preset times to a reversible motor via a control circuit. The control circuit is comprised of a relay activated by the timer and a series connected two-section switch. Outputs of the two-section switch are connected to the reversible motor through the limit switches. When the timer is triggered at a preset time, the draperies automatically open or closes. Via the two-section switch, the draperies may be manually activated to open or close at times other than the preset times on the timer.

U.S. Pat. No. 4,171,845 (Hirsch) teaches a window shade apparatus for an automobile or the like that may be fitted to a sun visor thereof, and in one embodiment the shade thereof may be raised and lowered through releasing of a brake system acting on the roller thereof. In another embodiment, an electrical switch may be actuated to drive a reversible electric motor in one and the other direction to raise and lower the shade of the apparatus.

U.S. Pat. No. 4,766,941 (Sloop et al.) teaches an electrically powered window shade with selectively variable shading characteristics that is installable within a window opening for selectively blocking (by absorption or reflection), filtering and/or transmitting light through the window shade into a room for purposes of energy control and/or decoration, etc. This window shade comprises an upper roller assembly, a lower roller assembly, and an elongate flexible web wound on the upper and lower roller assemblies, with the web being longer than the spacing between the upper and lower roller assemblies. Each of the roller assemblies comprises an elongate tubular roller, bearings engageable with the end of the roller for rotatably journaling the ends of the roller with respect to the window. The web is scrolled onto and from the rollers as the latter are rotated about their respective longitudinal axes. A drive is provided for each of the rollers so as to drive the rollers in one direction or the other so as to scroll the web from one of the rollers onto the other roller. The drive comprises a gear motor having an output shaft substantially coaxial with the gear motor, and with the gear motor being received within the roller, with the output shaft being coaxial with the roller. The gear motor is fixed against rotation with respect to the frame. Further, each of the gear motors includes a torsional spring for maintaining the web taut as it is scrolled and unscrolled from one roller to the other, and while the web is stationary and to accommodate changes in rotation rates and roll diameters as the web is scrolled and unscrolled. Specifically, this torsional spring operatively connects the output shaft of each gear motor with its respective roller. The torsional spring of one of the rollers is wound in one direction (e.g., clockwise), and the other torsional spring associated with the other gear motor is wound in the other direction (e.g., counterclockwise) so that upon initial energization of one gear motor or the other, differences in rotational speed and start-up times between the gear motors will be taken U.S. Pat. No. 4,979,582 (Forster) teaches a self-propelled roller drive unit with enclosed power source, motor(s) and transmission(s) that is coupled to external reaction load such as golf bag frame, wheelchair, industrial transport, personal transport or other drive unit. The self-propelled roller drive unit of the present invention encloses within a hollow cylinder, a complete self-energized power means—preferably a rechargeable electric battery power source, electric motor and transmission between the output shaft of the motor and the hollow roller. An external reaction load coupled to the enclosed power means adapts the drive unit to the form of a self-propelled golf bag cart, wheelchair, industrial transport, personal transport or other self-propelled drive unit.

U.S. Pat. No. 5,547,008 (Sullivan) teaches a universal motorized window blind system having a motor with an output shaft operatively attached to a mechanism for opening and closing horizontal mini blinds, and having adjustable limit switches to control the amount the blinds are opened or closed, and a hollow tube is connected at one end to the output shaft of the motor and connected at the other end to the mechanism for opening and closing the blinds. In a second embodiment a motorized system for opening and closing vertical blinds has adjustable limit switches to control the amount the blinds are opened or closed, and a wheel attached to the output shaft of the motor and the usual flexible endless loop of material for opening and closing the vertical blinds is looped around the wheel.

U.S. Pat. Nos. 5,714,855, 5,729,103, 5,883,480, 5,907,227, 6,060,852, 6,433,498, and 6,850,017 (Domel et al.) teach a mini-blind actuator that has a motor and a housing that holds the motor and a dc battery. The rotor of the motor is coupled to the baton of the mini-blind for rotating the baton and thereby opening or closing the slats of the mini-blind. Alternatively, the rotor is coupled to the tilt rod of the blind to rotate the tilt rod and thereby open or close the slats of the mini-blind. A control signal generator generates a control signal for completing the electrical circuit between the battery and the motor. The control signal can be generated in response to a predetermined amount of daylight or in response to a user-generated remote command signal. The actuator can be used to rotate the slats of horizontal or vertical blinds, or the sections of a pleated shade. Or, the actuator can be used to rotate the hollow rotatable tube of a roll-up shade. The battery pack is in a tube stored in the header portion of the shaded window. It is not internal to the storage tube and is mainly designed for horizontal shades.

U.S. Pat. Nos. 5,793,174, 5,990,646, 6,181,089, 6,259,218, and 6,369,530 (Kovach et al.) teach a wireless battery-operated window covering assembly. The window covering has a head rail in which all the components are housed. These include a battery pack, an interface module including an IR receiver and a manual switch, a processor board including control circuitry, motor, drive gear and a rotatably mounted reel on which lift cords wind and unwind a collapsible shade. The circuitry allows for dual-mode IR receiver operation and a multi-sensor polling scheme, both of which are configured to prolong battery life. Included among these sensors is a lift cord detector which gauges shade status to control the raising and lowering of the shade and a rotation sensor which, in conjunction with internal registers and counters keeps track of travel limits and shade position. These patents like the Domel patents disclose a battery pack in a tube located in the header portion of the window covering assembly but the header must be accessed or removed to service the batteries.

U.S. Pat. No. 6,533,017 (Toti) teaches window cover systems that include window cover material in the form of pleated panels or slats. The window cover material is suspended from a traverse track and is traversed along the track for opening and closing the window system. Arrangements for maintaining spacing and alignment of pleats or slats are provided. The alignment maintaining arrangements include traverse tapes which are substantially rigid in longitudinal and lateral directions in the plane of the tape, and are flexible in a direction perpendicular to the tape. The arrangements also include attaching the window cover material to vertical edge members and providing foldable spacer-members between adjacent edge-members. In one arrangement, a box-pleated panel of window cover fabric is suspended from a traverse track on slide-members. The slide-members are each attached to a spacer-tape at regular intervals along the spacer-tape. The spacer-tape is substantially rigid in the traverse direction and in a vertical direction perpendicular to the traverse direction. The window cover system is opened and closed by rolling and unrolling the panel and the spacer-tape around a roller located at one end of a window frame. Other arrangements include combined, tape-supported vertical slat blinds and vertical pleated draperies in which the tape(s) are supported by sprockets or wheels/pulleys.

U.S. Pat. No. 6,708,750 (Collet et al.) teaches a system for effecting and controlling the movement of a window covering between different positions. In particular, the present invention includes a motor coupled to a window covering by way of a drive assembly. The drive assembly includes one or more hollow shafts, a drive shaft, and a torque sensing mechanism. The drive shaft is coupled between the motor and a hollow, sliding shaft by way of the torque sensing mechanism. Rotation of the motor causes a lift cord to wind or unwind from the hollow sliding shaft wherein the frictional engagement of the lift cord against the hollow, sliding shaft causes the shaft to slide. Additionally, the present invention includes a method for detecting and responding to disturbances in force sensing devices coupled to the lift cord. The Invention may be comprised of power supplied by one or more chargeable or non-rechargeable batteries, low voltage power sources, solar power, or by an AC or DC power supply connected to the other elements of the Invention. In one embodiment, the battery power supply may be located in the headrail. In other embodiments, the battery power supply 36 may be mounted external to the head rail, by way of examples only, wall mounted or attached externally to head rail (FIG. 16).

U.S. Pat. No. 7,389,806 (Kates) teaches an electronically-controlled roll-up window shade that can easily be installed by a homeowner or general handyman. The motorized shade includes an internal power source, a motor, and a communication system to allow for remote control of the motorized shade. One or more motorized shades can be controlled singly or as a group. In one embodiment, the motorized shades are used in connection with a zoned or non-zoned HVAC system to reduce energy usage. In one embodiment, the motorized shade is configured to have a size and form-factor that conforms to a standard manually-controlled motorized shade. In one embodiment, a group controller is configured to provide thermostat information to the motorized shade. In one embodiment, the group controller communicates with a central monitoring system that coordinates operation of one or more motorized shades. In one embodiment, the internal power source of the motorized shade is recharged by a solar cell. FIG. 18 shows one embodiment of a motorized shade, with a tubular motor 303, internal batteries as the power source 350, and an electronics module 1801. The electronics module includes for example, the controller 301, the optional capacitor 306, the RF transceiver 302, and the optional RFID tag 309. FIG. 19 shows one embodiment of a motorized shade with a tubular motor 303, internal batteries as the power source 350, the electronics module 1801, and a fascia 1901. The embodiments shown in FIGS. 18 and 19 require either removal of the header or the fascia 1901 to service the batteries.

Accordingly, there is a need for a system to move, such as, horizontally, move vertical blinds, curtains, or draperies for example from a stored position to a deployed position, which can be motorized, as well as manually operated, and which reduces complexity compared with existing technology.

BRIEF SUMMARY

Embodiments of the invention relates to a motorized system for moving vertical blinds, curtains, draperies, or other window coverings. Specific embodiments can, optionally, also be manually operated. When motorized, the power supply can be batteries stored or housed in a tube or portion of a shaft, with a spring biased mechanism to assist during removal and/or loading of the batteries. In a specific embodiment, the stop can be triggered by the user to remove one battery at a time, and can allow the user to load batteries in a manner in which the battery or batteries already loaded in the chamber are held in the chamber. A specific embodiment incorporates a drapery tube with a hollow interior, or drapery shaft with one or more hollow portions, to form an enclosure that can house the motor and the power supply, such as batteries. If desired, the motor controls and an optional RF receiver for the motor can also be housed within the tube. In an embodiment, the batteries can be easily changed or replaced through the end of the tube or shaft, wherein the system has a stop, or release trigger, that can allow only one battery at a time to be loaded or unloaded, to assist in loading and unloading the batteries. In an embodiment, an end cap, such as a twist lock end cap can be positioned over the end of the tube or shaft when batteries are not being loaded or unloaded.

In a further embodiment, the batteries, which are the power supply for the motor, are loaded into a battery tube and the battery tube is inserted into the end of the drapery tube or shaft. If desired, the motor controls and/or the RF receiver can also be loaded in the battery tube. The battery tube can rotate with the drapery tube or shaft.

A battery spring can be included to assist in moving the batteries toward the end of the tube or shaft when unloading. In an embodiment, the spring is positioned in the battery tube. When unloading the batteries from the battery tube, a stop, or a battery stop, can prevent the batteries from being forced out of the tube by the battery spring, until the stop is depressed to release a battery. When loading batteries into the battery tube, the battery stop can hold each battery loaded into the battery tube within the battery tube until the next battery is loaded, pushing the previously loaded battery toward the battery spring. In this way, embodiments of the subject system allow controlled loading and unloading of the batteries into and out of the battery tube. Further, specific embodiments allow changing of the batteries without removing the drapery tube or shaft and/or without removing the battery tube from the drapery tube or shaft.

In a further specific embodiment, the system can prevent power from the batteries from being delivered until a mechanism is triggered, such as by installing an end cap back on the end of the tube or shaft, such as a twist lock end cap. In this way, when the end cap is removed power from the batteries to the motor is prevented and once the end cap is replaced power is again supplied from the batteries to the motor. Other mechanisms, such as a switch can also be used.

Embodiments of the inventions can be utilized with drapery tubes disclosed in U.S. provision patent application Ser. No. 61/702,093, filed on Sep. 17, 2012, which is hereby incorporated by reference in its entirety.

BRIEF DESCRIPTION OF DRAWINGS

FIG. 1 shows a perspective view of a drapery window cover rod or tube system in accordance with an embodiment of this invention.

FIG. 2 shows an enlarged end view of the system of FIG. 1.

DETAILED DISCLOSURE

Figure 11:
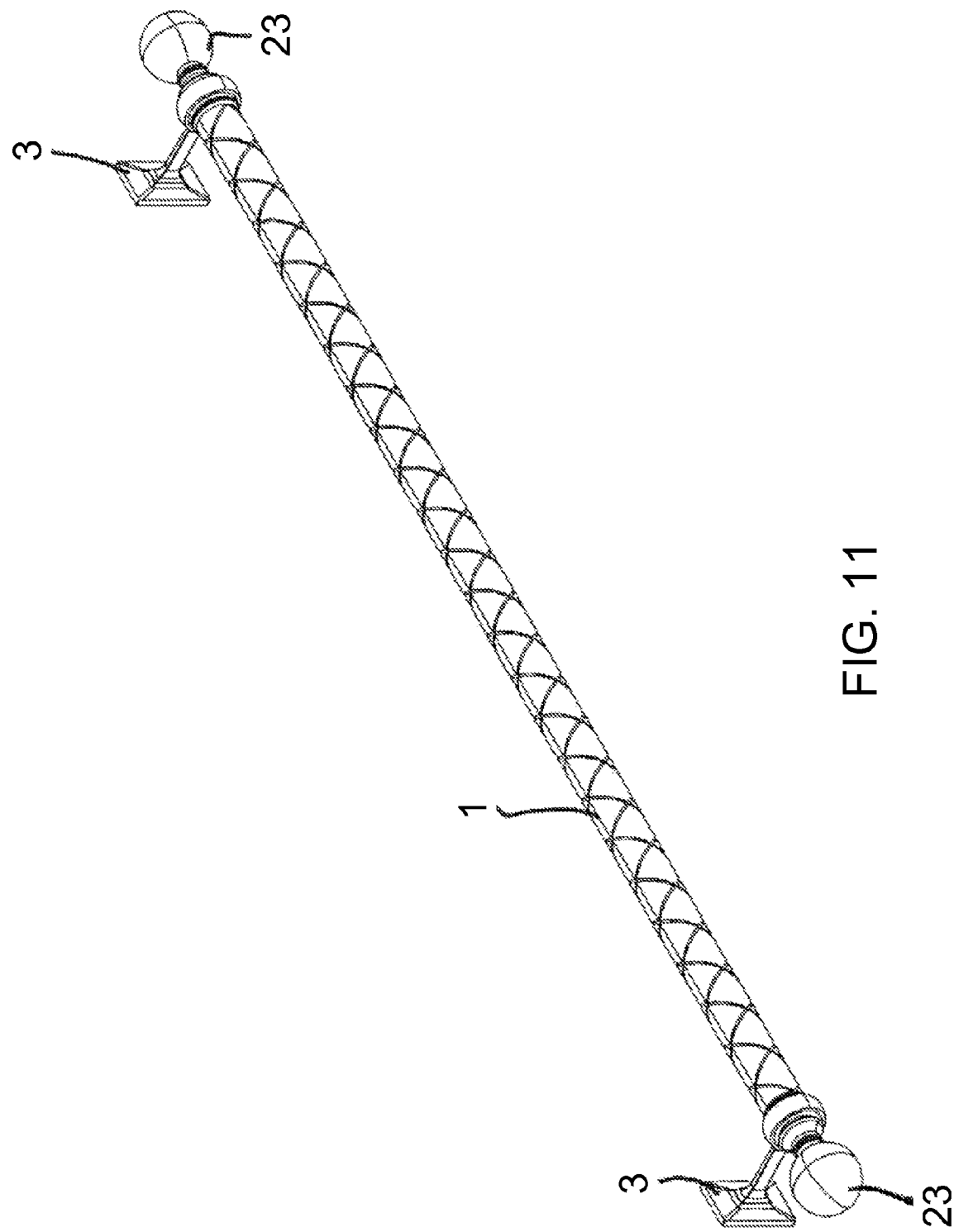
FIG. 11 shows a specific embodiment of a drapery window cover rod or tube system in accordance with the subject invention.
Figure 12:
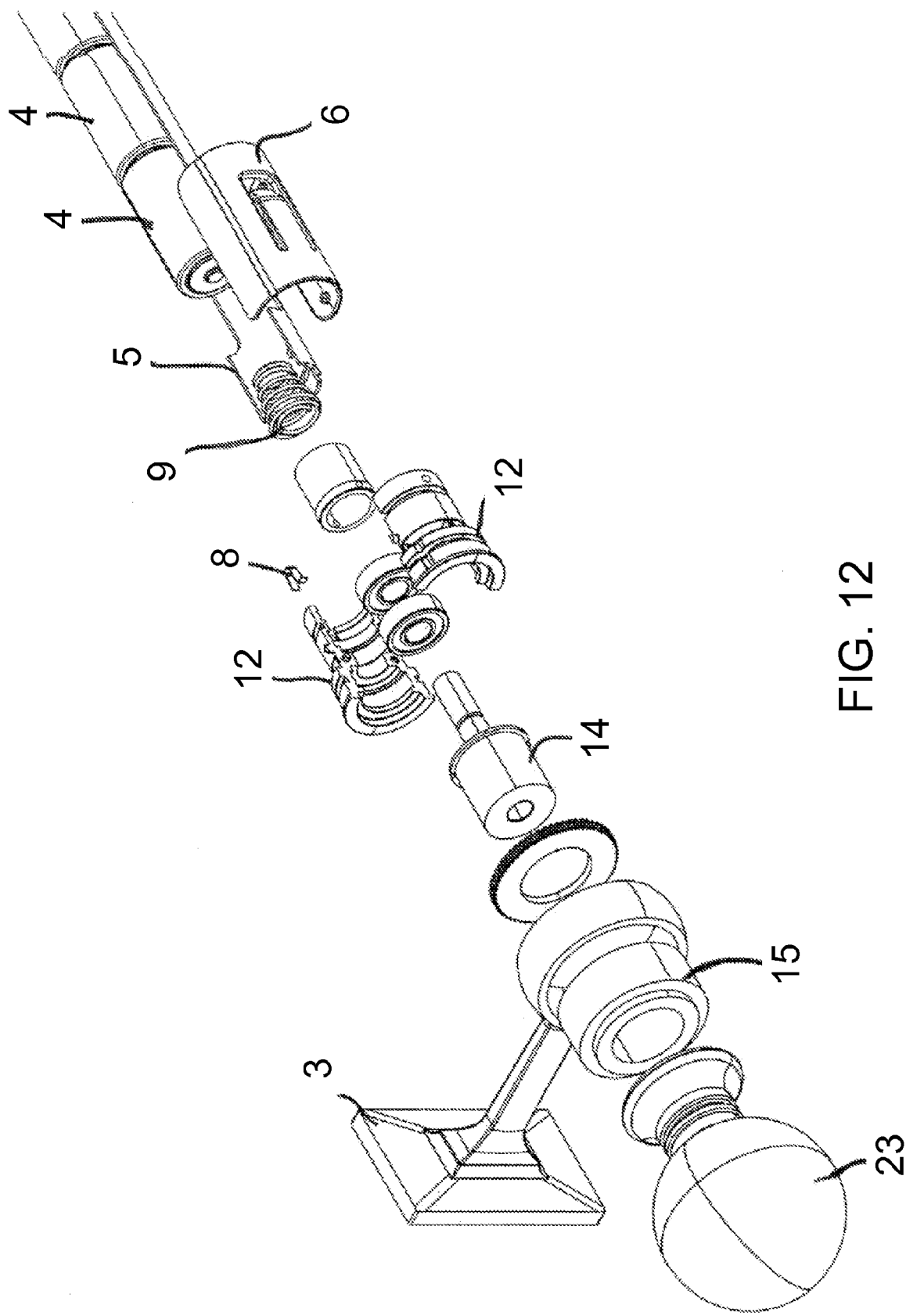
FIG. 12 shows an exploded view of the embodiment shown in FIG. 11.

Specific embodiments will be described in order to illustrate various features that can be incorporated in various embodiments of the subject invention. Referring to FIG. 1 and FIG. 11, the drapery rod or tube 1 is mounted with wall brackets 3 above an opening in a structure such that the drapery can extend and cover the opening. The drapery rod or tube can be motorized for rotating the rod or tube about a longitudinal axis of the rod or tube, and the motor and power supply can be within the rod or tube. In specific embodiments, such as shown in FIG. 1, the motor controls can also be internal to the drapery rod or tube, as taught in U.S. provisional application Ser. No. 61/702,093. In specific embodiments, the drapery rod or tube 1 can, optimally, have end caps.

The end caps 7 can be plain end caps, and can have compression rings. FIG. 1 shows plain end caps with compression rings 2 and FIG. 11 shows compression rings 2 with finials 23.

Figure 4:
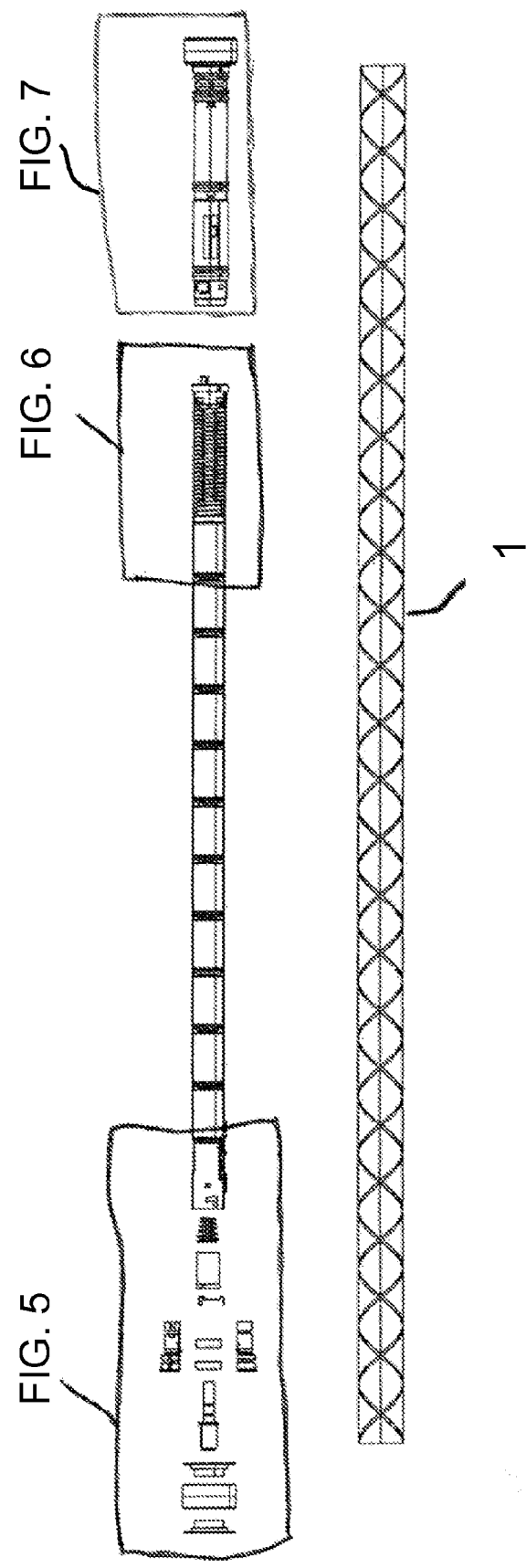
FIG. 4 shows a top view of the components of a specific embodiment of the subject invention.
Figure 5:
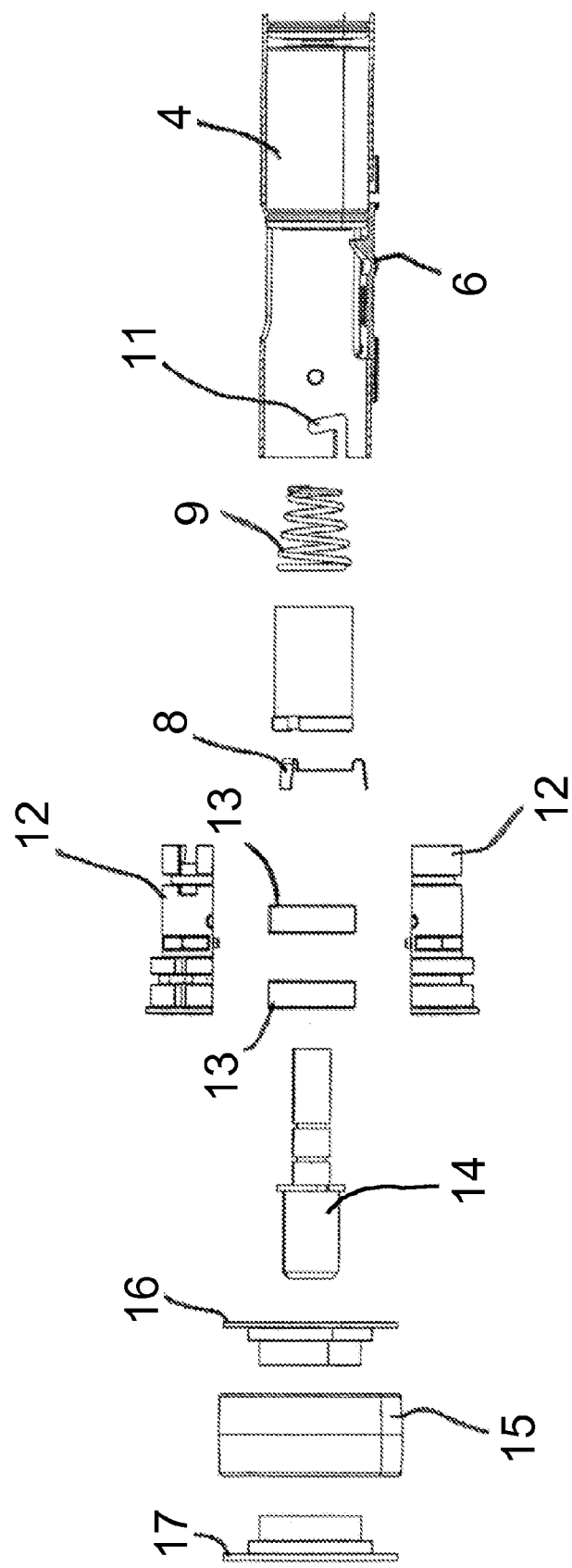
FIG. 5 shows an enlarged view of the components on the left hand side of the battery tube, within the box labeled FIG. 5 in FIG. 4.
Figure 6:
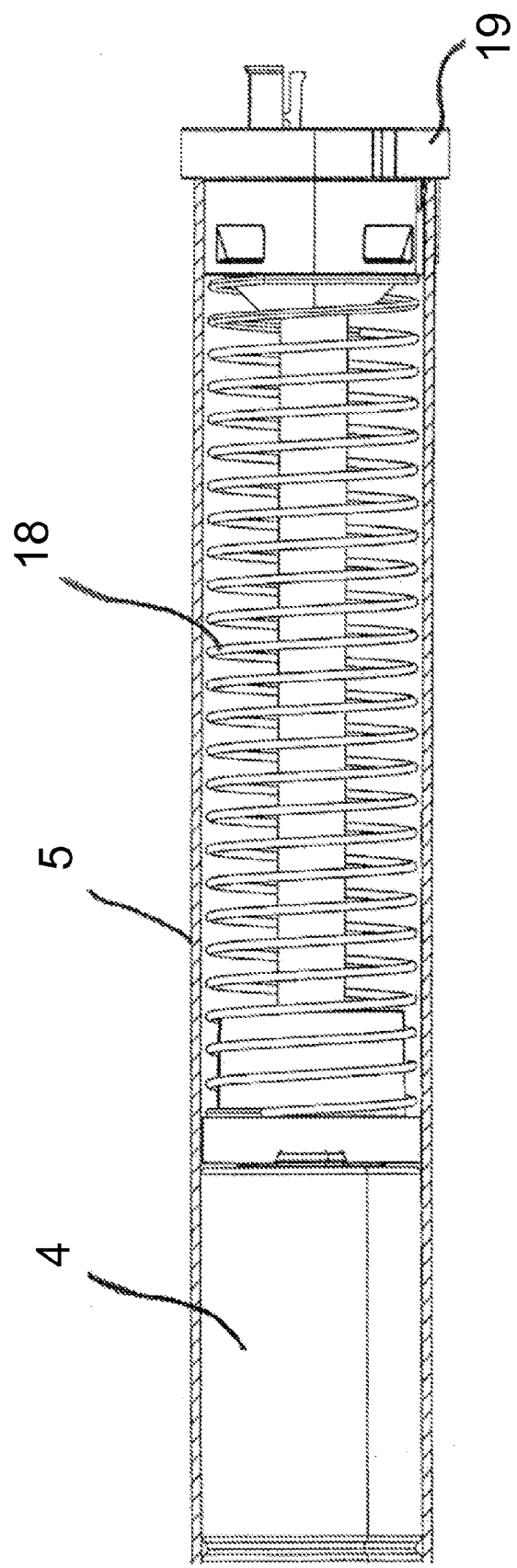
FIG. 6 shows an enlarged view of the right hand side of the battery tube, within the box labeled FIG. 6 in FIG. 4.

In specific embodiments, the drive components can be located within the rod or tube so as to be out of sight. FIG. 4 shows one orientation of components where a battery tube 5, as shown in FIG. 6, holds the components of the power supply, shown in an enlarged view FIG. 5 and FIG. 6, and the drapery rod or tube holds the battery tube assembly. The motor controls with the wireless receiver 20 and the motor assembly 21, as shown in an enlarged view in FIG. 7, can also be positioned in the rod or tube. The gap between the box labeled FIG. 6 and the box labeled FIG. 7 in FIG. 4 has an electrical connection meaning that the batteries in battery tube 5 (FIG. 6) are electrically connected to motor assembly 21 (FIG. 7).

Figure 3:
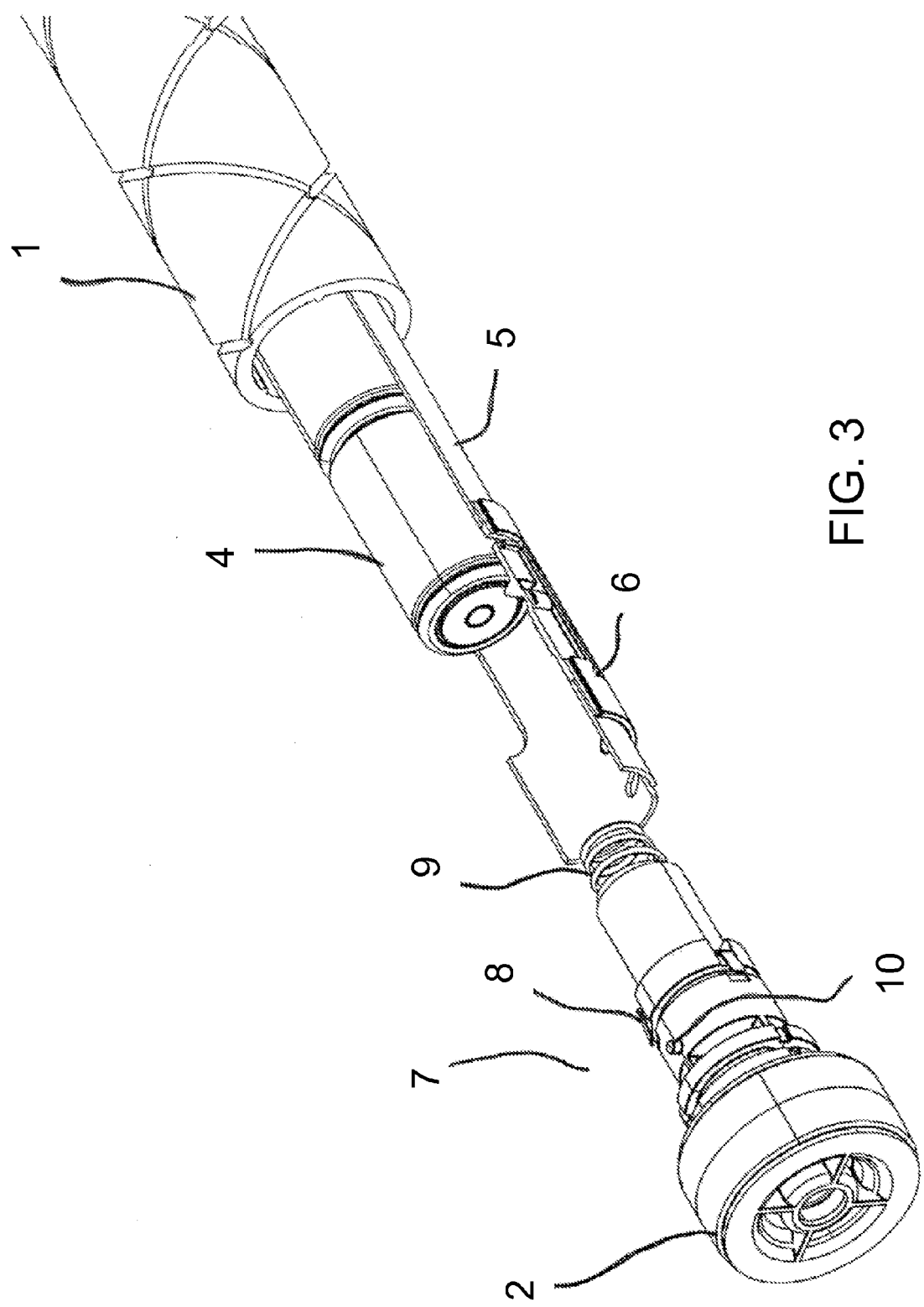
FIG. 3 shows an enlarged perspective view of the drapery window cover rod or tube of FIG. 1, showing a twist lock battery tube cap removed from the battery tube and the battery tube slid partially out of the drapery rod.
Figure 9:
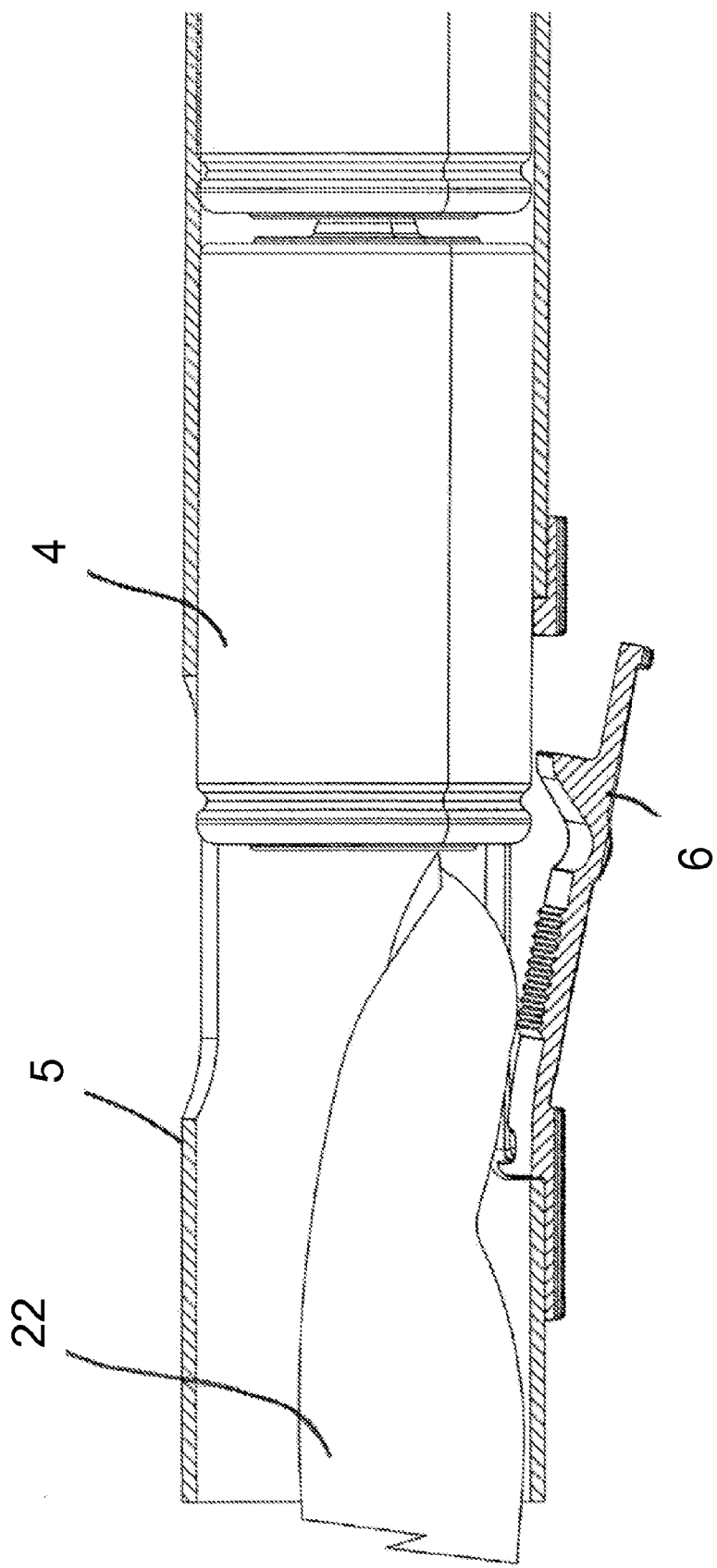
FIG. 9 shows the same enlarged view as FIG. 8, with the user's finger releasing the stop to allow one battery to be pushed from the tube by the battery spring.
Figure 10:
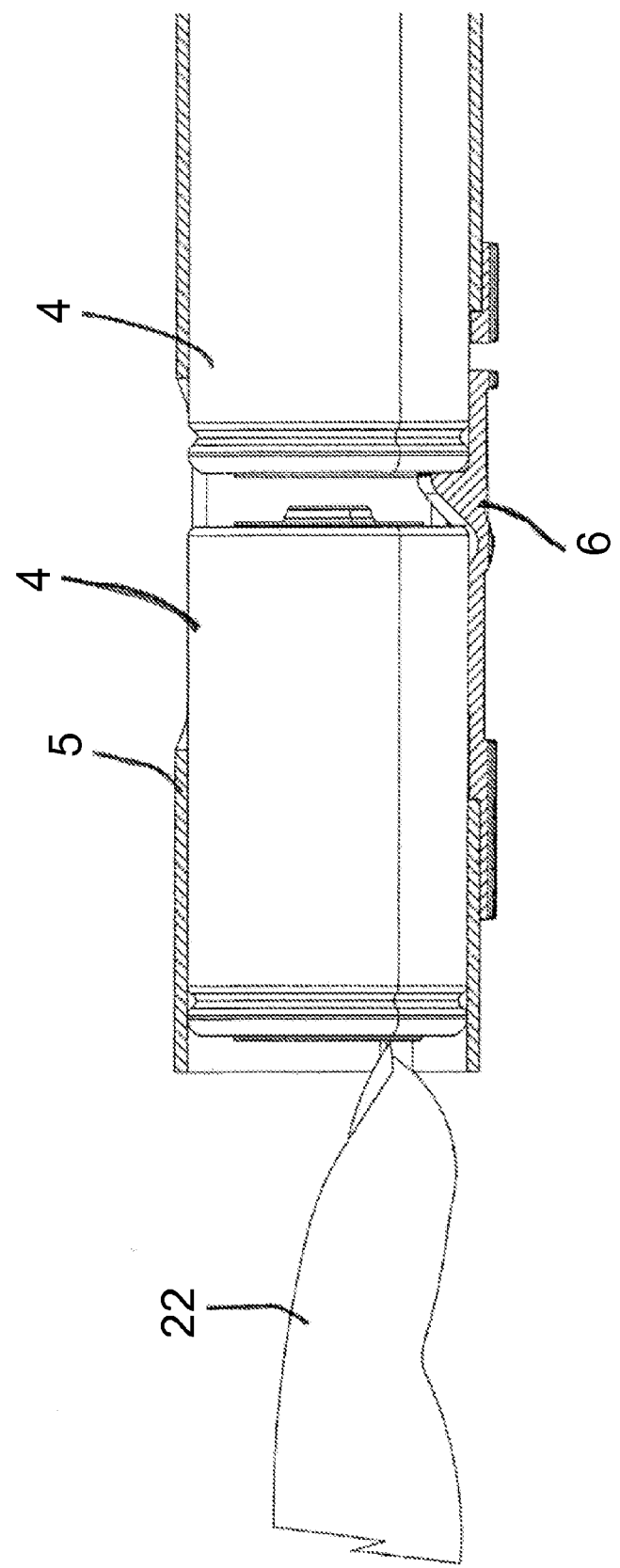
FIG. 10 shows the same enlarged view as FIG. 8, with the battery that has been released ready to be removed and the next battery being positioned against the stop.

Referring to FIG. 3, in a specific embodiment, when the power supply is a battery back housed in a separate battery tube 5, access to the battery tube 5 can be provided by removing the end cap 7 and removing the battery tube twist lock end cap. The batteries can then be removed by inserting a user's finger 22, or other object, in the opening and depressing the trigger stop 6 to release one battery as shown in FIG. 9. FIG. 10 shows how, as the battery spring 18 (shown in FIG. 6) pushes with sufficient force to expel the battery 4 and the trigger stop 6, no longer depressed by the finger, stops the next battery 4, until the trigger stop 6 is depressed again. In an embodiment, the battery spring 18 can provide an electrical conduit for the batteries 4. In a preferred embodiment, a contact post 24 provides an electrical conduit for the batteries 4.

Referring again to FIG. 3, the twist lock end cap 7 also has a spring 9, which provides the other electrical connection as well as biasing the twist lock end cap to hold it in place. The twist lock function is the combination of a sliding protrusion 10 on the bearing housings 12 into the slot 11 on the battery tube, compressing the spring 9, and rotating protrusion along the ramped portion of the slot 11, holding some tension on the spring. When assembled, the batteries are suspended between the contact post 24 (shown in FIG. 6) supported by the battery spring 18 and the twist lock end cap spring 9, such that the batteries do not touch the trigger stop 6 until the twist lock end cap 7 is removed from the battery tube 5.

Figure 7:
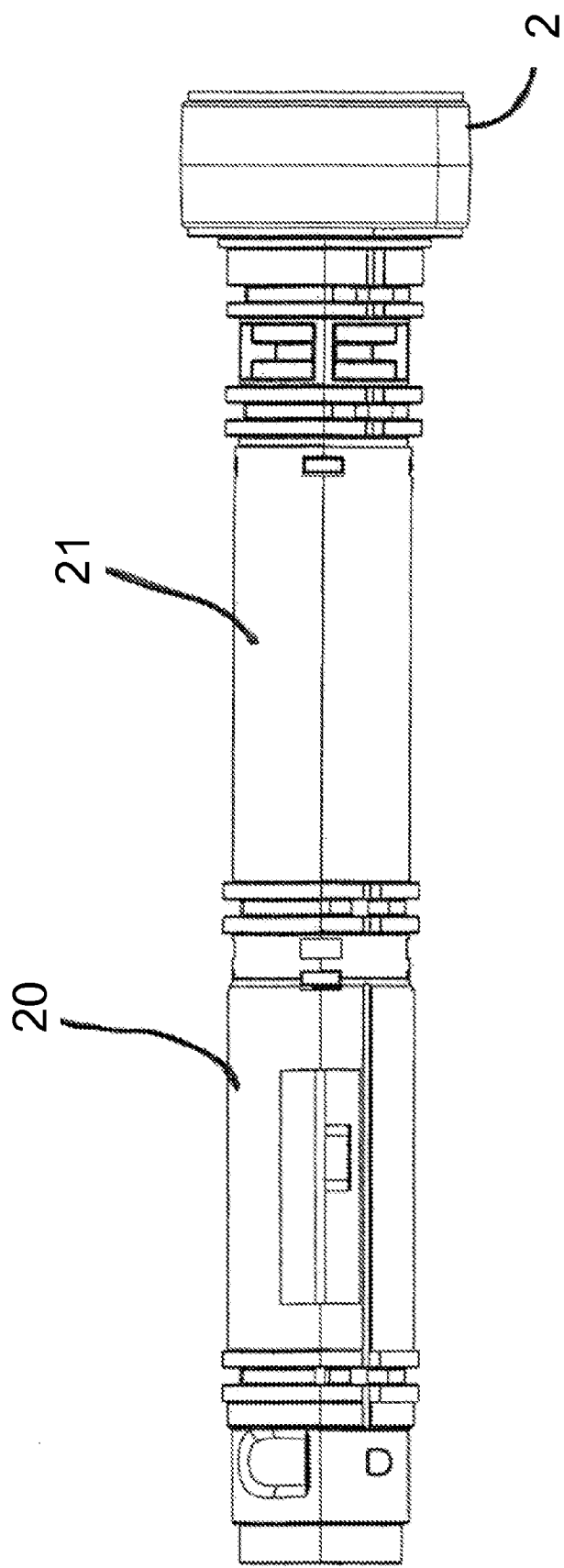
FIG. 7 shows an enlarged view of the motor and motor controls with the RF receiver, within the box labeled FIG. 7 in FIG. 4.
Figure 8:
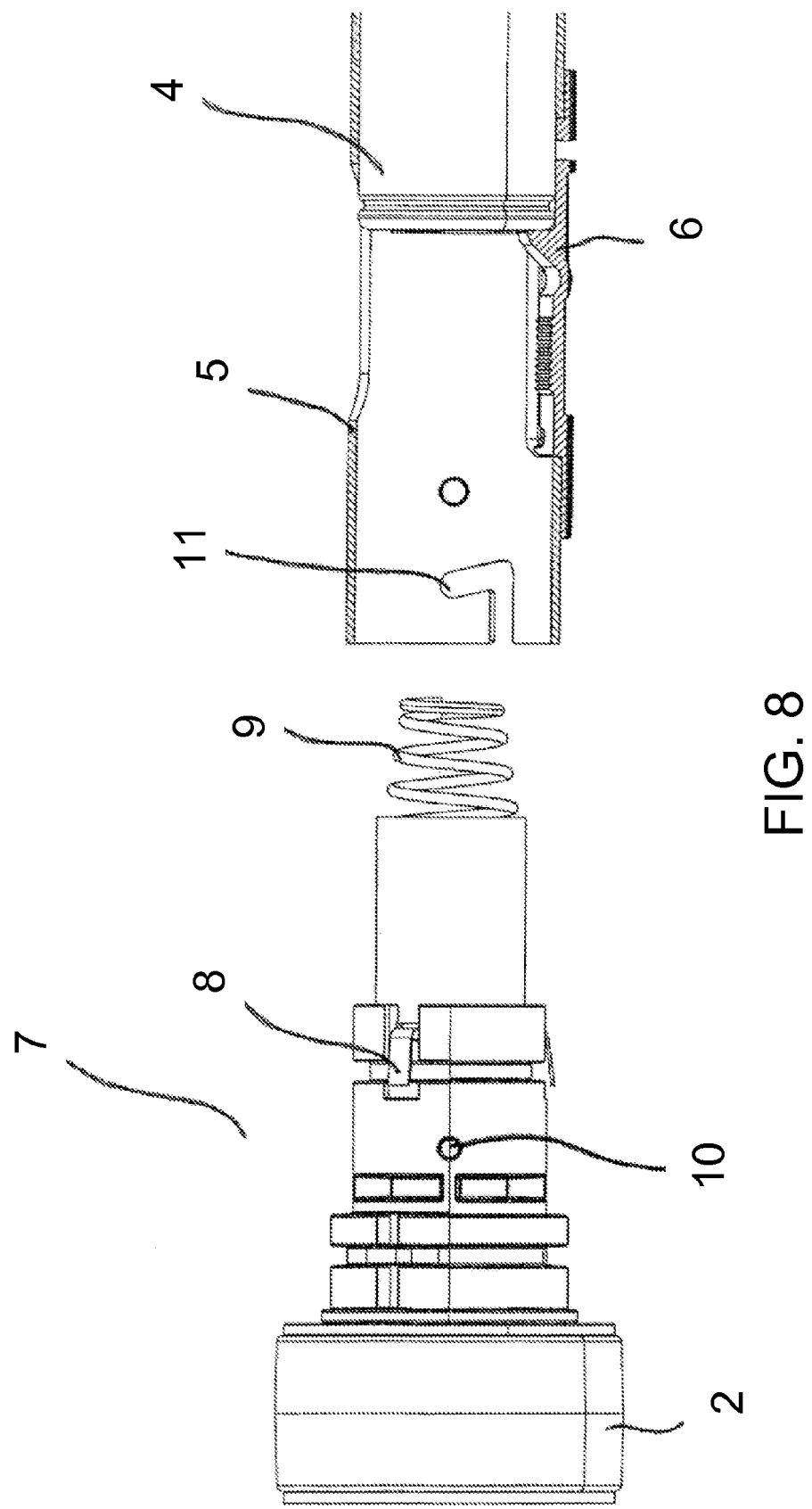
FIG. 8 shows an enlarged view of the end of the battery tube where the tube and the stop (trigger) are sectioned to show the function of the system, with the twist lock end cap removed and the batteries being held from movement by the stop.

In an embodiment, the motor controls 20 and the motor assembly 21 shown in FIG. 7 can be the same as those described in U.S. patent application Ser. No. 12/711,192, now U.S. Pat. No. 8,299,734. The receiver board can receive an infrared light signal or a radio frequency signal to command the movement of the drapery.

A drapery rod or tube with a hollow interior to form an enclosure that can house drive components and the power supply, such as batteries where the batteries can be easily changed or replaced through the end of the tube by removing a twist lock end cap with a stop or release trigger to allow only one battery at a time to be loaded or released to assist in loading and unloading of the batteries.

A drapery rod or tube with a hollow interior to form an enclosure that can house drive components and the power supply, such as batteries mentioned above where the drive components include a motor and a motor controller with a signal receiver for activating the motor to move the drapery.

A drapery rod or tube with a hollow interior to form an enclosure that can house drive components and the power supply, such as batteries mention above where the signal receiver can receive infrared signals or radio frequency signals or both.

Aspects of the invention, such as controlling the motor, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

REFERENCE NUMBERS

1. Drapery rod or tube
2. End caps
3. Wall brackets
4. Batteries
5. Battery tube
6. Battery stop or trigger
7. Battery tube twist lock end cap
8. Connector
9. Twist lock spring
10. Twist lock male
11. Twist lock female
12. Bearing housing half
13. Bearings
14. Shaft
15. Bushing
16. Inner flange
17. Outer flange
18. Battery spring
19. Battery tube stationary end cap
20. Motor control and RF receiver
21. Motor
22. Finger
23. Finials
24. Contact post

We claim:
1. A rod system, comprising:
a rod, wherein the rod comprises a hollow bore into a first end of the rod, wherein the rod is configured to receive at least two batteries into the hollow bore;
a motor, wherein the motor rotates the rod about a longitudinal axis of the rod, wherein the at least two batteries provide power to the motor;
a spring, wherein the spring is positioned within the hollow bore of the rod to provide an expulsion force on the at least two batteries once the at least two batteries are inserted into the hollow bore in an insertion direction along the longitudinal axis, wherein the expulsion force tends to push the at least two batteries in a withdrawal direction, wherein the withdrawal direction is opposite to the insertion direction; and
a stop, wherein as each of the at least two batteries is sequentially inserted into the hollow bore in the insertion direction, once a proximal end of an inserted battery is inserted past a certain position with respect to the stop, the stop prevents the inserted battery from being pushed by the spring in the withdrawal direction past where the proximal end of the inserted battery is at the certain position with respect to the stop, unless the stop is released.

2. The system according to claim 1, wherein the hollow bore extends through the rod, such that the rod is a hollow tube.

3. The system according to claim 1, wherein the stop is configured such that when the stop is released, a proximal end of a most proximal inserted battery is pushed by the spring in the withdrawal direction past the certain position such that the most proximal inserted battery becomes a withdrawn battery and the next most proximal inserted battery becomes the most proximal inserted battery, and the most proximal inserted battery continues to be pushed by the spring in the withdrawal direction until the stop prevents the proximal end of the most proximal inserted battery from being pushed by the spring in the withdrawal direction past where the proximal end of the inserted battery is at the certain position with respect to the stop, unless the stop is released.

4. The system according to claim 1, further comprising:
a battery tube, wherein the battery tube is configured to receive the at least two batteries, wherein the stop is positioned on the battery tube,
wherein the rod is configured to receive the battery tube into the hollow bore,
wherein the rod receives the at least two batteries into the hollow bore by the rod receiving the battery tube into the hollow bore and the battery tube receiving the at least two batteries.

5. The system according to claim 1, further comprising an end cap, wherein the end cap covers the first end.

6. The system according to claim 1, wherein the stop is configured to be released by a user or object pushes on the stop.

7. The system according to claim 6, wherein the user or object no longer pushes on the stop, the stop is not released.

8. The system according to claim 1, wherein the motor is positioned in the hollow bore.

9. The system according to claim 8, further comprising: motor controls, wherein the motor controls are positioned in the hollow bore.

10. The system according to claim 8, wherein the motor controls comprise receiver, wherein the receiver receives commands for operating the motor to rotate the rod, wherein the receiver is positioned in the hollow bore.

11. A window covering system, comprising:
a battery tube, the battery tube extending a longitudinal length from a first end to a second end, the battery tube having a hollow bore;
a spring, the spring positioned within the hollow bore of the battery tube;
a stop connected to the battery tube, the stop having an outward facing surface and an inward facing surface;
a plurality of batteries positioned within hollow bore of the battery tube;
a motor;
wherein the plurality of batteries are inserted into the hollow bore of the battery tube in end-to-end alignment;
wherein when the plurality of batteries are inserted into an open end of the battery tube in end-to-end alignment the spring provides an expulsion force on the plurality of batteries;
wherein the outward facing surface of the stop allows the batteries to pass thereby as they are inserted into the hollow bore of the battery tube in an insertion direction;
wherein the inward facing surface of the stop holds the batteries within the hollow bore of the battery tube against the expulsion force of the spring along the longitudinal length;
wherein the plurality of batteries provide power to the motor; and
wherein the motor operates a rod of a window covering.

12. The system according to claim 11, further comprising an end cap removably connected to an open end of the battery tube.

13. The system according to claim 11, wherein the battery tube positioned in a hollow bore of the rod.

14. The system according to claim 11, wherein the motor is positioned in a hollow bore of the rod.

15. The system according to claim 11, wherein the battery tube and the motor are positioned in a hollow bore of a rod.

16. The system according to claim 11, wherein a battery is removed from the hollow bore of the batter tube by deflecting the stop away from the battery and allowing the expulsion force of the spring to force the battery outward past the stop.

17. A battery tube system, comprising:
a battery tube, extending a longitudinal length from a first end to a second end, the battery tube having a hollow bore;
a spring, the spring positioned within the hollow bore of the rod;
a stop connected to the battery tube adjacent the first end;
a plurality of batteries positioned within the hollow bore of the rod;
wherein the plurality of batteries are inserted into the hollow bore of the battery tube in end-to-end alignment;
wherein when the plurality of batteries are inserted into an open end of the battery tube in end-to-end alignment the spring provides an expulsion force on the plurality of batteries;
wherein the stop deflects between a stop position, and a release position;
wherein when the stop is in a stop position, the stop holds the plurality of batteries within the hollow interior of the battery tube; and
wherein when the stop is in a release position, the stop allows an outward most battery to move past the stop along the longitudinal length.

18. The system according to claim 17, wherein the battery tube is positioned within a hollow bore of a rod.

19. The system according to claim 17, wherein the battery tube is electrically connected to a motor.

20. The system according to claim 17, further comprising an end cap removably connected to an open end of the battery tube.

* * * * *